US012152956B2

(12) United States Patent
Jansen et al.

(10) Patent No.: US 12,152,956 B2
(45) Date of Patent: Nov. 26, 2024

(54) METHOD FOR BALANCING A WHEEL WITH INTEGRATED ELECTRIC MOTOR

(71) Applicant: Lightyear IPCo B.V., Helmond (NL)

(72) Inventors: Wouter Jansen, Eindhoven (NL); Djanini Markovic, Breda (NL); Arie Johannis van der Ham, Eindhoven (NL)

(73) Assignee: Lightyear IPCo B.V., Helmond (NL)

( * ) Notice: Subject to any disclaimer, the term of this patent is extended or adjusted under 35 U.S.C. 154(b) by 891 days.

(21) Appl. No.: 16/973,659

(22) PCT Filed: Jun. 3, 2019

(86) PCT No.: PCT/EP2019/064248
§ 371 (c)(1),
(2) Date: Dec. 9, 2020

(87) PCT Pub. No.: WO2019/238438
PCT Pub. Date: Dec. 19, 2019

(65) Prior Publication Data
US 2021/0255052 A1    Aug. 19, 2021

(30) Foreign Application Priority Data

Jun. 12, 2018 (NL) ...................... 2021103

(51) Int. Cl.
*G01M 1/32* (2006.01)
*B60K 7/00* (2006.01)
(Continued)

(52) U.S. Cl.
CPC ........... *G01M 1/326* (2013.01); *B60K 7/0007* (2013.01); *G01B 7/30* (2013.01); *G01M 1/045* (2013.01);
(Continued)

(58) Field of Classification Search
CPC ...... G01M 1/326; G01M 1/225; G01M 1/045; G01M 1/28; B60K 7/0007; B60K 2007/0038; B60K 2007/0092; G01B 7/30
See application file for complete search history.

(56) References Cited

U.S. PATENT DOCUMENTS

| 4,499,768 A | * | 2/1985 | Madden | ................ | G01M 1/225 |
| | | | | | 73/462 |
| 4,502,328 A | * | 3/1985 | Wood | .................... | G01M 1/225 |
| | | | | | 73/462 |

(Continued)

FOREIGN PATENT DOCUMENTS

| CN | 207388747 U | 5/2018 |
| DE | 4426482 A1 | 2/1996 |

(Continued)

OTHER PUBLICATIONS

International Search Report and Written Opinion dated Jul. 3, 2019, corresponding to Application No. PCT/EP2019/064248.

(Continued)

*Primary Examiner* — Paul M. West
(74) *Attorney, Agent, or Firm* — Patterson + Sheridan, LLP

(57) ABSTRACT

The invention relates to a method of balancing a wheel assembly of an electric car, in which the wheel assembly comprises an in-wheel motor. The wheel assembly (with the tire mounted on it) is spun by the in-wheel motor, the imbalance is measured by a sensor on the wheel and the angular orientation is determined by an orientation sensor. A control unit in the car then determines the position and weight needed for balancing the wheel.

10 Claims, 3 Drawing Sheets

(51) Int. Cl.
*G01B 7/30* (2006.01)
*G01M 1/04* (2006.01)
*G01M 1/22* (2006.01)

(52) U.S. Cl.
CPC ..... *G01M 1/225* (2013.01); *B60K 2007/0038* (2013.01); *B60K 2007/0092* (2013.01)

(56) References Cited

U.S. PATENT DOCUMENTS

| | | | |
|---|---|---|---|
| 5,889,206 A * | 3/1999 | Coetsier | G01M 1/225 |
| | | | 73/462 |
| 2012/0207599 A1 * | 8/2012 | Delache | F04D 29/662 |
| | | | 416/1 |
| 2013/0106168 A1 | 5/2013 | Kim et al. | |

FOREIGN PATENT DOCUMENTS

| | | |
|---|---|---|
| EP | 0694775 A2 | 1/1996 |
| EP | 0849579 A2 | 6/1998 |
| WO | 2010/055534 A1 | 5/2010 |
| WO | 2011078006 A1 | 6/2011 |

OTHER PUBLICATIONS

Netherlands Search Report dated Jan. 24, 2019, corresponding to Application No. 2021103.
Chinese Office Action dated Apr. 14, 2022, for Chinese Patent Application No. 201980039540.1.

* cited by examiner ed on the

METHOD FOR BALANCING A WHEEL WITH INTEGRATED ELECTRIC MOTOR

TECHNICAL FIELD OF THE INVENTION

The invention relates to a method for balancing a wheel assembly, the wheel assembly showing a rim, the wheel assembly comprising:
- a tire mounted on said rim,
- the wheel assembly at least during the balancing rotated by a balancing motor,
- the wheel assembly at least during the balancing in contact with an imbalance sensor for measuring imbalance of the wheel assembly, and an orientation sensor at least during the balancing determining the angular orientation of the wheel assembly,
- the balancing comprising the addition and/or removal of one or more balance weights,
- the method comprising repeatedly performing the steps of:
  - a step of spinning up the rim by the balancing motor,
  - a step of measuring the imbalance using the imbalance sensor while the wheel assembly and the tire mounted thereupon are rotated by the balancing motor, as well as measuring the orientation of the imbalance using the orientation sensor,
  - a step to decide whether the imbalance is, at a pre-set rotation speed or rotation speed range, below a pre-set level,
  - if the outcome of the step to decide is that the imbalance is at a pre-set rotation speed or rotation speed range, is above a pre-set level,
    - a step of determining and indicating mass and position of the one or more balance weights using data from the imbalance sensor and the orientation sensor,
    - a step of stopping the rotation of the wheel-assembly,
    - a step of adding or removing one or more balancing masses to the wheel assembly at the indicated position,
  - until the outcome of the step to decide is that the imbalance is at a pre-set rotation speed or rotation speed range, is below a pre-set level, and the rotation of the wheel-assembly is stopped, wherein one or more of these steps may show temporal overlap with another step, Background of the invention.

When a tire is mounted on a wheel, the combination of the two is normally not balanced. This is caused by imperfect symmetry of tire and rim, the presence of a tire valve, etc. When such an unbalanced wheel/tire combination is used when driving a car, this results in vibrations, uneven wear of the tire, etc. Therefore, a wheel with tire should be balanced after exchanging the tire, or after damage, such as denting of the wheel.

A conventional wheel shows a part that is mounted on the axle hub. The axle hub shows several stud bolts and the wheel several corresponding bolt holes on a pitch-circle diameter. The number of stud bolts is typically between 4-6 for a passenger vehicle and 10 for a truck, although other numbers are known. The conventional wheel further shows a rim for mounting a tire. The wheel is mounted on the axle hub by several nuts.

Special machinery for balancing a conventional wheel with a tire mounted thereupon is readily available at almost every garage where tires are sold. Such a machine is known from European Patent Application EP0694775 (A2) to Rothamel et al [-1-]. Such a machine works as follows: the wheel with the tire mounted thereupon is mounted on the machine, spun by a balancing motor (typically an electric motor), and the imbalance and orientation of the imbalance are indicated by the machine. The amount of imbalance is translated to a mass to be mounted on a diameter, typically the rim diameter. Manually a balancing weight, for example made of zinc mass that is cramped or a stainless-steel mass that is glued, is mounted on the rim at the indicated orientation. The procedure is repeated until the imbalance is below a set value at a pre-set rotation speed or speed range.

It is noted that the imbalance sensor may, for example, be a vibration sensor, a velocity sensor or an acceleration sensor. The orientation sensor may be part of an odometer, or may be a dedicated, stand-alone sensor, or such like.

When using in-wheel motors this implies that the motors should fit within the diameter of the rim. Such in-wheel motors are known, for example from Elaphe Propulsion Technologies Ltd., its M700 motor (http://in-wheel.com/product-category/motors/). Such an in-wheel motor has a stator, a rotor, and often a braking system (either disk brakes or drum brakes). On the stator electrical coils generate a rotating electro-magnetic field, while the rotor has a number of permanent magnets. The interaction between the rotating electro-magnetic field and the permanent magnets exert a torque on the rotor, resulting in a rotation of the wheel assembly. In-wheel motors are quite heavy, and this implies that the 'unsprung mass' (the mass placed between ground and suspension system) is quite high, necessitating a more intricate suspension system and/or heavier suspension system than when using a conventional wheel assembly (without in-wheel motor). Still, in-wheel motors have several advantages, such as a high efficiency, making such a motor a prime candidate for use in for example all-electric cars.

When using an in-wheel motor the rotor typically extends to the outer diameter of the in-wheel motor.

To lower the unsprung mass it is known to mount the rim of the wheel assembly directly on the rotor, eliminating all other parts of the wheel, connecting the rim to the axle hub. Such a wheel without the parts for connecting the wheel to the axle hub is further named 'rim-wheel'. The eliminated parts on the in-wheel motor are a disk or at least spokes for the rim going to the centre, and the mass associated with this disk or spokes (that must show structural strength for the static and dynamic forces acting on the wheel assembly). It also eliminates on the rim-wheel a disk or spokes connected to the rim and forming a central part with the bolt holes, the disk or spokes also showing structural strength for the static and dynamic forces acting on the wheel assembly. The elimination of these parts showing structural strength in turn results in a lower so called 'unsprung' mass of the wheel assembly.

It is noted that a cover covering the whole diameter of the rim-wheel may be needed to shield the inner parts of the in-wheel motor from dirt, moisture, etc. However, this may be a relatively light-weight cover as it need not show the structural strength for the static and dynamic forces acting on the wheel assembly.

It is further noted that the rim of a rim-wheel may be mounted on the rotor with a several bolts, or the rim may be integrated with the rotor.

A problem arises when balancing such a rim-wheel: most garage shops do not have a balancing machine equipped to accept such a rim-wheel.

A solution would be to have with the car an adaptor on which the rim is mounted and showing provisions to be mounted on the axle hub (provided that the rim is not integrated with the rotor). This would enable the rim-wheel to be mounted on the conventional balancing machine.

However, such an adaptor takes up space, weight etc.

Another problem is that what the conventional balancing method balances, is the combination of wheel and tire, (with an adaptor: the combination of rim-wheel, tire and adaptor), and not the combination of rim-wheel, tire and in-wheel motor.

In "Real-time Tire Imbalance Detection Using ABS Wheel Speed Sensors,", Lu, J. et al., *SAE Int. J. Mater. Manuf.* 4(1):1036-1047, 2011, https://doi.org/10.4271/2011-01-0981, [-2-] a method to detect tire imbalance is described while driving by detecting vibrations via ABS sensors. The signal of the ABS sensors is filtered and compared with each other. Although this method gives an insight of the degree of imbalance, the publication does not mention how this is translated in a mass and orientation of a balance weight.

SUMMARY OF THE INVENTION

The present invention was made in view of the prior art described above, and the problems arising when combining the prior art with a wheel assembly having a rim-wheel and an in-wheel motor.

To solve the problem the present invention provides a method and a vehicle to overcome these problems.

To that end the method according to the invention is characterized in that
  the wheel assembly comprises an in-wheel electric motor, the in-wheel electric motor showing a stator and a rotor, the rotor connected to or integrated with the rim,
  the balancing motor is the in-wheel electric motor,
  The rotor is at least during the balancing freely rotatable,
  The imbalance sensor is permanently mounted on the stator, and
  The orientation sensor is permanently mounted on the wheel assembly.

By using the in-wheel motor as the balancing motor, and a built-in imbalance sensor and orientation sensor, all balancing can be done while the rim with the tire mounted thereon are mounted on the car. This implies that what is balanced is the combination of tire and wheel assembly (including in-wheel motor), what is an advantage over the conventional method.

In an embodiment of the method of the invention the imbalance sensor (5) is a sensor from the group of vibration sensors, acceleration sensors, and velocity sensors.

In another embodiment of the method of the invention the wheel assembly further comprises a braking system from the group of disk brakes and drum brakes.

In vehicles using electric motors typically electric braking is used to recover kinetic energy when braking. However, legally it is required that several wheels are equipped with braking systems that also acts as a brake when the vehicle does not move, such as a conventional drum brake or a conventional disk brake. For a passenger vehicle the number of wheels that should have such a conventional braking system is at least four. As this is typically the number of wheels a passenger vehicle has, all wheels need a conventional braking system on top on the electric braking system.

In yet another embodiment of the method of the invention the orientation sensor is a sensor deriving angular orientation from the electric signal used to drive the in-wheel motor.

In still another embodiment of the method of the invention the in-wheel motor is an in-wheel motor from the group of axial flux permanent magnet motors, radial flux permanent magnet motors, reluctance motors and inductance motors In an aspect of the invention an electrical vehicle equipped with a wheel assembly, the wheel assembly comprising an in-wheel electric motor, the in-wheel motor showing a rotor and a stator,
is characterized in that:
  the wheel assembly comprises an imbalance sensor and an orientation sensor for determining the angular orientation of the wheel assembly,
  The vehicle is equipped with a control unit (CU), the CU equipped to energize the in-wheel motor and to process data from the imbalance sensor and orientation sensor, and a display to provide information to a user,
  The CU is programmed to perform the steps of:
    a step of spinning up the in-wheel motor,
    a step of measuring the imbalance using the imbalance sensor while the wheel assembly is rotated by the in-wheel motor, as well as measuring the orientation of the imbalance using the orientation sensor,
    a step of determining and displaying mass and position of one or more balance weights using data from the imbalance sensor and the orientation sensor, or to indicate that the imbalance is, at a pre-set rotation speed or rotation speed range, below a pre-set level, masses using data from the imbalance sensor and the orientation sensor,
    a step of stopping the rotation of the wheel-assembly, In an embodiment of the vehicle according to the invention the imbalance sensor is a sensor from the group of vibration sensors, acceleration sensors, and velocity sensors.

In another embodiment of the vehicle according to the invention the wheel assembly further comprises a braking system from the group of disk brakes and drum brakes.

In yet another embodiment of the vehicle according to the invention the orientation sensor derives angular information from the electric signal used to drive the in-wheel motor.

In still another embodiment of the vehicle according to the invention the in-wheel motor is an in-wheel motor from the group of axial flux permanent magnet motors, radial flux permanent magnet motors, reluctance motors, and inductance motors.

BRIEF DESCRIPTION OF THE DRAWINGS

The invention is now elucidated using figures, in which identical reference signs indicate corresponding features. To that end.

DETAILED DESCRIPTION OF THE INVENTION

Figure 1:
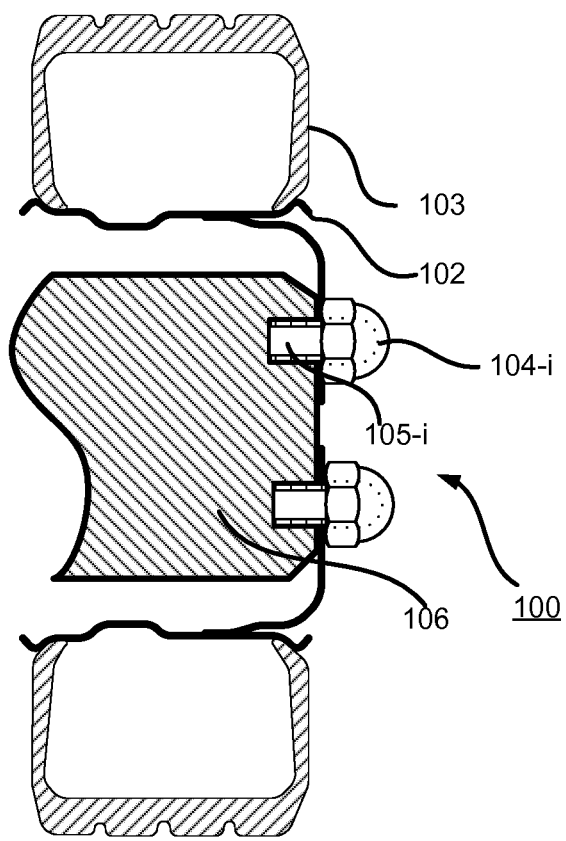
FIG. 1 schematically shows a cross-section of a conventional wheel with a tire mounted thereon, FIG. 2 schematically shows a cross-section of an axial flux permanent magnet machine, FIG. 3 schematically shows a cross-section of an in-wheel motor with a rim-wheel, FIG. 4 schematically shows a flowchart of a conventional method for balancing, and FIG. 5 schematically shows a flowchart of a method according to the invention.

FIG. 1 schematically shows a cross-section of a conventional wheel with a tire mounted thereon.

FIG. 1 schematically shows a cross-section of a conventional wheel 100, the wheel showing a rim 102 with a tire 103 mounted on the rim.

Such a wheel is used in, for example, cars with a central motor, such as a combustion engine, and in most hybrid cars, equipped with both a combustion and a central electric motor. The wheel is mounted on the vehicle through several nuts 104-i that are bolted on corresponding stud bolts 105-i extruding from the axle hub 106. The number of stud bolts, and thus nuts, varies from four to six for a passenger vehicle and typically equals ten for a truck, although other numbers of stud bolts and nuts are known.

The wheel may be a disk wheel, showing a plate with several ventilation holes, or a spoke wheel, where the rim is connected to the center of the wheel via several spokes.

it is noted that a conventional wheel need not have a braking system, as the braking may be done at another position in the drive train. In most cases the brake system is placed on the (rotatable) axle hub.

Figure 2:
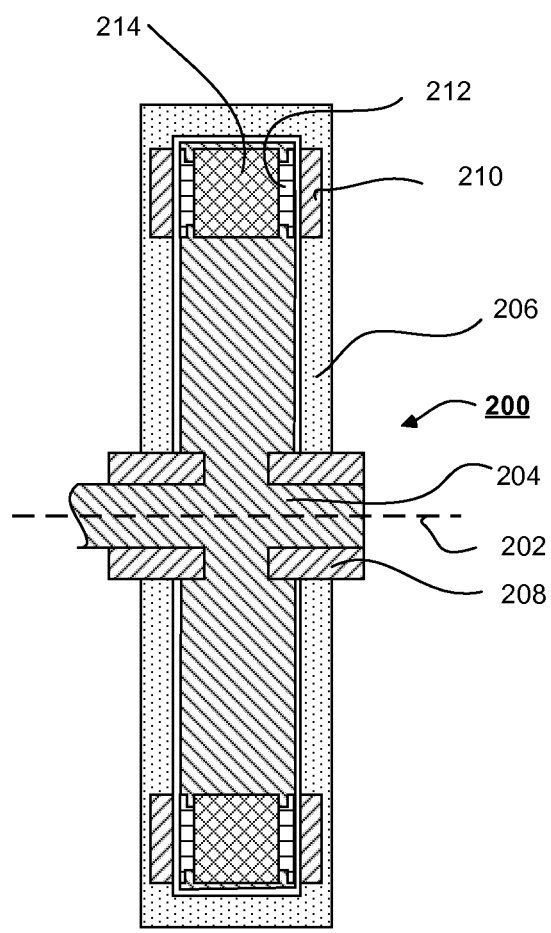

FIG. 2 schematically shows a cross-section of an axial flux permanent magnet machine (AFPMM).

FIG. 2 schematically shows an AFPMM 200. Such an AFPMM is known from e.g. European patent publication EP3245718A1. Such a machine shows a stationary axis 202 around which a stator 204 is extends, and around which a rotor 206 can rotate. Stator and rotor are mounted on each other by bearings 208-1 and 208-2, that must take forces along the axis 204 and perpendicular to the axis 204.

In the stator, a series of electromagnets 212-i are mounted. These electromagnets are magnetized (excited) by coils 214-i. The pole pieces of the electromagnets are made of, for example, a laminated stack of grain-oriented silicon iron. The choice for grain oriented silicon iron is made for its magnetic properties. Laminating is needed as the magnetic field of the coils, oriented along the direction of the axis, can have a frequency in the order of 1 kHz. Massive pole pieces of e.g. NiFe (Nickel-Iron) would exhibit losses due to eddy currents.

The rotor 206 shows a number of permanent magnets 210-j. The attraction and repulsion of the (varying) electromagnets 212-i and the permanents magnets 210-j result in a torque on the rotor with respect to the stator.

It is noted that the number of electromagnets is not equal to (twice the) number of permanent magnets.

Although the stator is shown as a massive disk extending from the axis to the electromagnets, this need not be the case: the stator may be locally reduced in thickness or equipped with holes, or, beneficially, part of the stator is non-metallic to avoid eddy currents near the permanent magnets. It is known to embed the electromagnets in a ring of, for example, nylon, with cut-outs in which the electromagnets are fixed. Fixing can be achieved with glue or resin.

Many alternatives for this motor (the AFPMM) are known and other motor types (e.g. the radial flux permanent magnet motor, the reluctance motor, etc.) are known, all of which are equally feasible for this invention.

Figure 3:
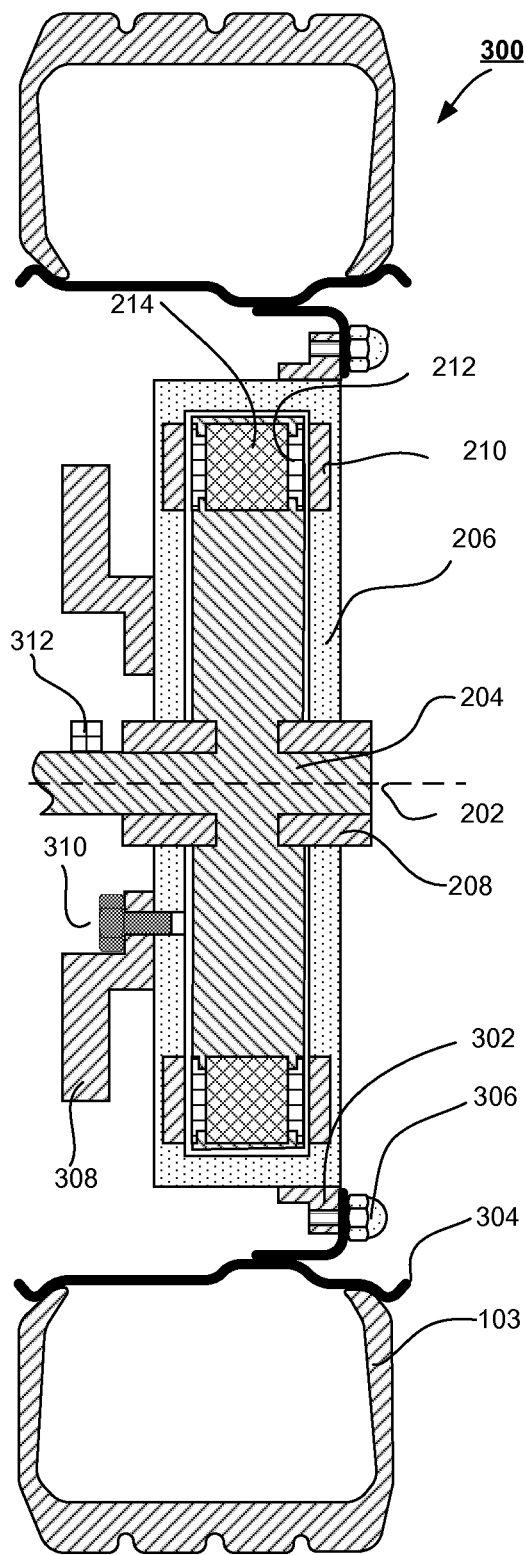

FIG. 3 schematically shows a cross-section of an in-wheel motor with a rim-wheel. FIG. 3 can be thought to be derived from FIG. 2. It schematically shows a cross-section of an in-wheel motor as shown in FIG. 2 with a rim-wheel. The rim-wheel is reduced to a number of studs 302 on which the rim 304 is bolted with bolts 306. On the rim a tire 103 is mounted. Balancing of the rim is, with a conventional balancing machine, not possible, as the bolts have a wildly other pitch and number than the bolts with which a conventional wheel is mounted on the axle hub (see FIG. 1).

A solution would be to equip each car with an adaptor. However, this would imply extra mass and space in the car at all times and it would balance the combination of in-wheel motor, rim wheel and adaptor instead of the combination of in-wheel motor, rim-wheel and tire.

As braking cannot be done elsewhere in the drive train, a brake disk 308 is mounted on the rotor 206 with several bolts 310. The brake claw (not shown) can be mounted on the stator.

It is noted that here the rim is shown to be detachable from the rotor, although it is well possible to integrate the two. However, this would make changing a tire more difficult, and would probably imply dismounting the wheel and the in-wheel motor just to exchange the tire.

Figure 4:
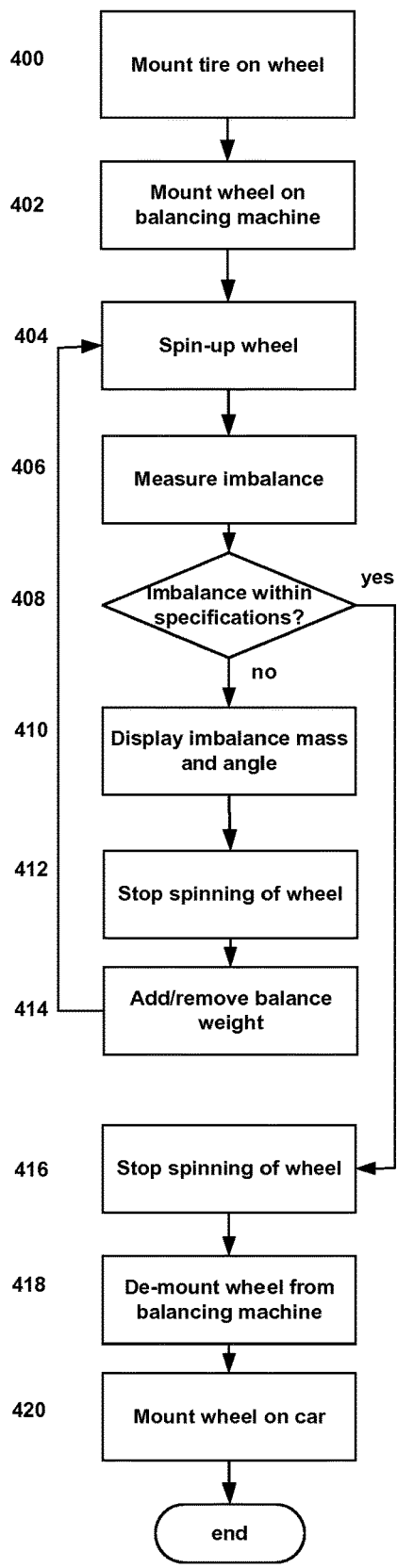

FIG. 4 schematically shows a flowchart of a conventional method for balancing. This technique, using a conventional balancing machine, is well-known, and almost every garage where tires are repaired or exchanged, has such a balancing machine. The balancing machine has at least a motor (in most cases an electric motor) to spin-up and spin-down the wheel, an imbalance sensor, an orientation sensor, and a processor to determine from the signals of these sensors and manual input stating, among others, the radius on which balance weights are mounted.

In step 400 a tire 103 is mounted on (the rim 102 of) a wheel 100.

It is noted that this is the normal entry, but sometimes this step is skipped and that it is not essential to the invention.

The tire may be a new tire, a repaired or a re-covered tire. It may also be that the tire is exchanged with a tire with another rubber compound (for use in different temperature ranges) or with other profile.

In step 402 the wheel, with the tire mounted thereupon, is mounted on a conventional balancing machine. This is a well-known technique and needs no further explanation.

In step 404 the wheel is spun until it rotates with a preset rotation speed.

At first the rotational speed is low to avoid dangerous vibration of the wheel, with a possible overloading of the mount between wheel and balancing machine, leading to dangerous situations.

Often the rotational speed is increased in steps, each step followed by a measurement to determine whether the situation is more than can be safely handled.

In step 406 the imbalance is measured

It is noted that, as mentioned earlier, often the rotational speed of step 404 is increased if the combination of rotational speed and imbalance are below certain values.

In step 408 it is determined whether the imbalance is within specifications. If the imbalance is within specifications, no further balancing is needed, and the next step is step 416, otherwise the method continues with step 410.

In step 410 the measured imbalance is converted to a mass of the balance weight and an angular position where is must be positioned on a radius, normally the rim radius, and display this information for a mechanic to select the weight and attach it by e.g. crimping or gluing.

In step 412 the wheel is spun down so that is can be handled.

In step 414 a balance weight is added of a mass and an orientation shown by the balancing machine. Normally the balancing is then checked by returning to step 404.

In step 416, reached after it is determined that the imbalance is within pre-set limits the wheel is stopped.

In step 418 the wheel is taken from the balancing machine.

In step 420 the wheel is then mounted on the car. The balance is now checked, but it is noted that imperfections in.

It is noted that in this schematic process the steps are depicted as separate steps.

However, steps may be executed overlapping and/or simultaneously. For example, step 410 and step 412 may well be executed simultaneously.

It is further noted that steps 404-412 and step 416 are executed by (a control unit being part of) the balancing machine.

Figure 5:
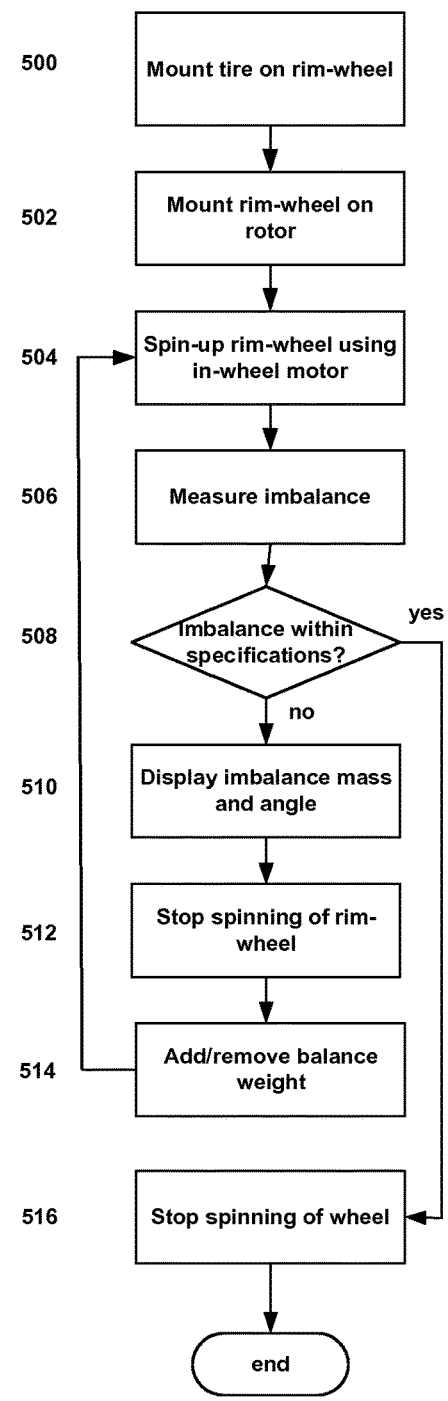

FIG. 5 schematically shows a flowchart of a method according to the invention.

In FIG. 5 a schematic flowchart for the method according to the invention is shown. FIG. 5 can be thought to be derived from FIG. 4.

In step 500, comparable to step 400, the tire is mounted on the rim-wheel.

In step 502, comparable to step 402, the rim-wheel with the tire mounted thereon is mounted on the rotor of the in-wheel motor.

In step 504, comparable to step 404, the rim-wheel is spun up by the in-wheel motor. It is noted that, for that to be possible, it is necessary that the wheel is free from the 'ground' and freely rotatable.

In step 506, comparable to step 406, the imbalance is measured using data from the imbalance sensor 312. This may be a vibration sensor, an acceleration sensor, or a velocity sensor. The signal of the imbalance sensor must be correlated with the angular position, and therefore an orientation sensor determining the angular orientation is needed as well. This may be for example a magnetic sensor where one part comprising a magnet is mounted on the rotor and the other part on the stator, or vice versa. As an alternative the angular orientation may be derived from the electrical signals driving the in-wheel motor (or generated by it).

In step 508, comparable to step 408, it is determined whether the imbalance is within specifications. If the imbalance is within specifications, no further balancing is needed, and the next step is step 516, otherwise the process continues with step 510.

In step 510, comparable to step 410, the measured imbalance is converted to a mass and an angular position and displayed.

In step 512, comparable to step 412 the wheel is spun down so that is can be handled.

In step 514, comparable to step 414, a balance weight is added of a mass and an orientation shown by the balancing machine. Normally the balancing is then checked by returning to step 404. It is noted that the weight need not be placed (cramped, glued) on the rim but may also take the form of, for example, screwing a weight such as a screw with a predefined mass in the rotor. For this the rotor may be equipped with a number of screw holes at different radii.

In step 516, comparable to step 416, the wheel is stopped, and the method is ended.

It is noted that steps 504-516, except for step 514, are preferably executed by a control unit (CU) in the vehicle, the CU equipped to energize the in-wheel motor and to process data from the imbalance sensor and orientation sensor and to derive a state of imbalance from the data derived from the sensors.

Although the invention is explained in relation to embodiments, it is to be understood that many other possible modifications and variations can be made without departing from the scope of the present invention. It is therefore contemplated that the claims of this invention cover such modifications and variations that fall within the true scope of the invention. Especially the order and possible temporal overlap of the procedural steps of this invention can be changed without abandoning the scope of the invention.

CITED LITERATURE

[-1-] European Patent Application EP0694775 (A2), Rothamel et al.
[-2-] Real-time Tire Imbalance Detection Using ABS Wheel Speed Sensors,", Lu, J., Filev, D., and Johnson, L., *SAE Int. J. Mater. Manuf.* 4(1):1036-1047, 2011, https://doi.org/10.4271/2011-01-0981.

The invention claimed is:

1. A method for balancing a wheel assembly, the wheel assembly showing a rim, the wheel assembly comprising:
   a tire mounted on said rim,
   the wheel assembly at least during the balancing rotated by a balancing motor,
   the wheel assembly at least during the balancing in contact with an imbalance sensor for measuring imbalance of the wheel assembly, and an orientation sensor at least during the balancing determining the orientation of the wheel assembly,
   the balancing comprising the addition and/or removal of one or more balance weights,
   the method comprising repeatedly performing the steps of:
   a step of spinning up the rim by the balancing motor,
   a step of measuring the imbalance using the imbalance sensor while the wheel assembly and the tire mounted thereupon are rotated by the balancing motor, as well as measuring the angular orientation of the imbalance using the orientation sensor,
   a step to decide whether the imbalance is, at a pre-set rotation speed or rotation speed range, below a pre-set level,
   if the outcome of the step to decide is that the imbalance is at a pre-set rotation speed or rotation speed range, is above a pre-set level,
     a step of determining and indicating mass and position of the one or more balance weights using data from the imbalance sensor and the orientation sensor,
     a step of stopping the rotation of the wheel-assembly,
     a step of adding or removing one or more balancing masses to the wheel assembly on the indicated position of the wheel assembly,
   until the outcome of the step to decide is that the imbalance, at a pre-set rotation speed or rotation speed range, is below a pre-set level, and the rotation of the wheel-assembly is stopped, wherein one or more of these steps may show temporal overlap with another step,
   wherein:
   the wheel assembly comprises an in-wheel electric motor, the in-wheel electric motor showing a stator and a rotor, the rotor connected to, or integrated with, the rim,
   the balancing motor is the in-wheel electric motor,
   the rotor is at least during the balancing freely rotatable,
   the imbalance sensor is permanently mounted on the stator, and
   the orientation sensor is permanently mounted on the wheel assembly.

2. The method of claim 1 in which the imbalance sensor is a sensor from the group of vibration sensors, acceleration sensors, and velocity sensors.

3. The method of claim 1 in which the wheel assembly further comprises a braking system from the group of disk brakes and drum brakes.

4. The method of claim 1 in which the orientation sensor is a sensor deriving the angular orientation from the electric signal used to drive the in-wheel motor.

5. The method of claim 1 in which the in-wheel motor is an in-wheel motor from the group of axial flux permanent magnet motors, radial flux permanent magnet motors, reluctance motors, inductance motors.

6. An electrical vehicle equipped with a wheel assembly, the wheel assembly comprising an in-wheel electric motor, the in-wheel motor showing a rotor and a stator, wherein:
- the wheel assembly comprises an imbalance sensor and an orientation sensor for determining the angular orientation of the wheel assembly,
- the electrical vehicle is equipped with a control unit (CU), the CU equipped to energize the in-wheel motor and to process data from the imbalance sensor and orientation sensor, and a display to provide information to a user, the CU programmed to perform the steps of:
- a step of spinning up the in-wheel motor,
- a step of measuring the imbalance using the imbalance sensor while the wheel assembly is rotated by the in-wheel motor, as well as measuring the orientation of the imbalance using the orientation sensor,
- a step to decide whether the imbalance is, at a pre-set rotation speed or rotation speed range, below a pre-set level,
- if the outcome of the step to decide is that the imbalance is not below said pre-set level,
    - a step of determining and displaying mass and position of one or more balance weights using data from the imbalance sensor and the orientation sensor, or to indicate that the imbalance is, at a pre-set rotation speed or rotation speed range, below a pre-set level,
    - a step of stopping the rotation of the wheel-assembly, enabling the addition or removal of balance weights,
- until the outcome of the step to decide is that the imbalance is at a pre-set rotation speed or rotation speed range, is below a pre-set level, and the rotation of the wheel-assembly is stopped, wherein one or more of these steps may show temporal overlap with another step.

7. The electrical vehicle of claim 6 in which the imbalance sensor is a sensor from the group of vibration sensors, acceleration sensors, and velocity sensors.

8. The electrical vehicle of claim 6 in which the wheel assembly further comprises a braking system from the group of disk brakes and drum brakes.

9. The electrical vehicle of claim 6 in which the orientation sensor is a sensor deriving the angular orientation from the electric signal used to drive the in-wheel motor.

10. The electrical vehicle of claim 6 in which the in-wheel motor is an in-wheel motor from the group of axial flux permanent magnet motors, radial flux permanent magnet motors, reluctance motors, inductance motors.

* * * * *